July 26, 1927.
W. A. RANKIN
TEMPERATURE INDICATOR
Filed April 12, 1921
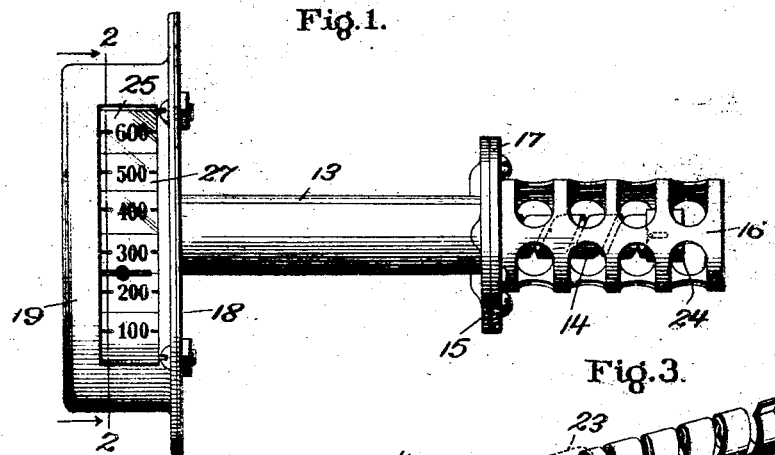
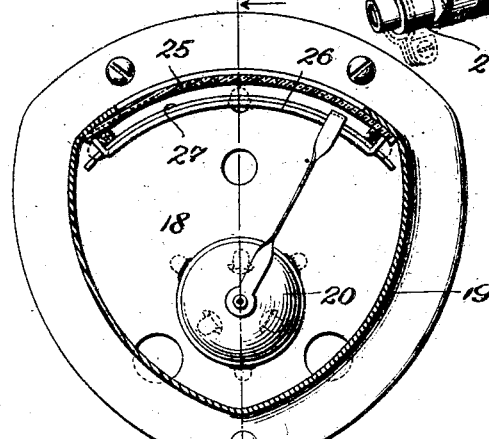
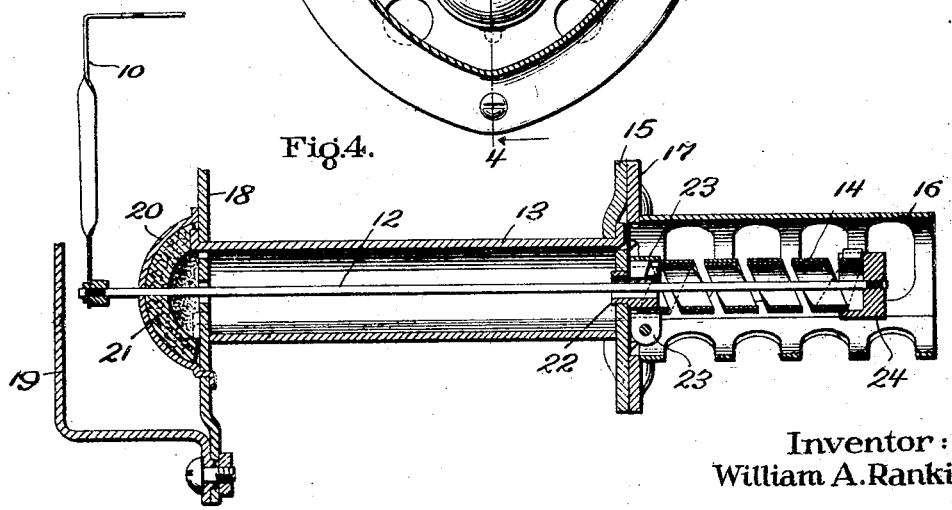
Inventor:
William A. Rankin,
by Albert G. Davis
His Attorney.

Patented July 26, 1927.

1,637,050

UNITED STATES PATENT OFFICE.

WILLIAM A. RANKIN, OF OAK PARK, ILLINOIS, ASSIGNOR TO EDISON ELECTRIC APPLIANCE COMPANY, INC., A CORPORATION OF NEW YORK.

TEMPERATURE INDICATOR.

Application filed April 12, 1921. Serial No. 460,727.

My invention relates to temperature indicators and has for its object the provision of a device for indicating temperature which is reliable and efficient in operation, simple and rugged in construction, and economical to manufacture.

More specifically my invention relates to temperature indicators employing a helical thermostatic heat responsive element. In devices of this character trouble has been experienced from the fact that the thermostatic element and the pointer shaft have been constrained by a plurality of supports and bearings in certain positions, by reason of which when the device is hot the helix is subjected to strains and the pointer shaft has a tendency to bind.

In carrying out my invention, I employ a helical thermostatic element which is supported at one end only, and a pointer shaft having one end journaled in a casing and the other end rigidly attached to and carried by the free end of the thermostatic element. This construction insures free movement at all times of both the thermostatic element and the pointer shaft without undue stress and friction. Although, it has other uses, my invention is particularly applicable for indicating the temperature of ovens, furnaces, and the like. My invention can be applied to the body of the oven with the heating element extending within the oven where it is directly affected by the temperature in the oven. This is a decided advantage over the usual method of mounting the thermometer on the oven door with the heat responsive element inside the inner lining. When mounted in this manner the thermostatic element does not respond quickly to changes in temperature of the oven, since the heat must be slowly conducted through the lining of the oven, while with the thermostatic element in direct contact with the air in the oven, the temperature is accurately indicated at all times.

In the accompanying drawing, Fig. 1 is a plan view of an oven thermometer embodying my invention; Fig. 2 is a section of Fig. 1 along the line 2—2 looking in the direction of the arrows; Fig. 3 is a view of the thermostatic element with the attaching means therefor; and Fig. 4 is a section of Fig. 2 along the line 4—4 looking in the direction of the arrows.

Referring to the drawing, the pointer 10 is rigidly mounted on one end of a pointer shaft 12, which extends through wall tube 13 and a helical thermostatic element 14, to the free end of which it is rigidly attached. The helical thermostatic element is rigidly mounted at its other end on a circular plate 15 attached to tube 13. A guard 16, consisting of a hollow perforated cylinder, is provided for the thermostatic element. The guard is carried by plate 17 which is attached to plate 15 by suitable screws so as to hold the guard in place.

Attached to the end of tube 13 adjacent the pointer is a suitably shaped plate 18 with which a cap member 19 cooperates forming a casing for the pointer. An arc 26 carrying a scale 27, graduated in degrees, is attached to plate 18 at right angles thereto. The end of the pointer is bent over at right angles so as to move over the scale when rotative movement is given to the shaft 12. The cap member 19 is provided with a suitable opening above the scale so that the scale may be easily read through a protecting glass 25. The plate 18 and tube 13 are joined by means of tongues on the end of the tube which are inserted in slots in the plate and bent over; this forms a simple and reliable joint of relatively low cost. Plates 15 and 17 are attached to tube 13 and guard 16, respectively, in a similar manner, and likewise arc 26 to plate 18. As shown in Fig. 2, the slots in plate 18 are arc shaped and considerably wider than the cooperating tongues on tube 13, thus permitting a slight relative angular movement between the plate and tube. This provides a convenient zero adjustment for the pointer.

The pointer shaft 12 extends through a relatively large hole in plate 18 and is journaled in a cup-shaped member 20 which is attached to plate 18 by a tongue and slot connection. Inside of cap 20 is a piece of fibrous heat insulating material 21 which is fitted closely around the pointer shaft and held tightly against plate 18 by cap 20; this provides a tight joint around the pointer shaft preventing the escape of heat from the oven.

The connection between the left-hand end of the thermostatic spiral 14 and the plate 15 is formed by means of a hollow cylindrical member 22 (Fig. 3), one end of which is reduced in size so as to fit tightly in a central hole in plate 15, the other end having a longitudinal slot. The thermostatic spiral is slipped over member 22 for a short distance, the end of the spiral projecting inward in the slot so as to prevent relative rotative movement. The spiral is held in place on member 22 by means of a strap 23. The right-hand end of the thermostatic spiral is free, the spiral being constructed with sufficient rigidity to be self-supporting, and has a short portion bent outward so as to coöperate with a longitudinal slot in cap 24, which fits tightly in place on the end of the spiral, and to which the right-hand end of the pointer shaft is rigidly attached. The cap 24 and also pointer 10 may be attached to shaft 12 by a frictional connection, one of the engaging surfaces being roughened.

As thus constructed the temperature indicator is attached to the oven with the plate 18 against the outside wall thereof, the wall tube 13 extending through the oven wall, and the thermostatic element projecting into the oven. The temperature indicator may be located at some point at which the scale may be read with convenience and with the thermostatic element projecting into a part of the oven where it is out of the way. An increase of temperature in the oven will affect the thermostatic element so as to cause rotation of the pointer shaft and movement of the pointer over the scale to indicate the temperature in degrees.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States, is:—

1. An oven thermometer comprising a hollow support adapted to be secured in an aperture in an oven wall, a spindle extending through said support, thermo-responsive means mounted on the inner end of said support connected to turn said spindle, indicating means including an arm fastened to and extending radially from the outer end of said spindle, an index member attached to said spindle, an index member attached to and extending angularly from the free end of said arm, a casing attached to the outer end of said support enclosing said arm and index member, said casing having a curved edge wall provided with an opening adjacent which said index member is movable.

2. An oven thermometer comprising a shell arranged to be secured in an opening in an oven wall, closures for the ends of said shell provided with apertures, a spindle extending through said shell and said apertures, thermo-responsive means for turning said spindle connected with the inner end of said spindle, indicating means including an arm fastened to and extending radially from the outer end of said spindle, an index member attached to and extending angularly from the free end of said arm, a casing attached to the outer end of said shell enclosing said arm and index member, said casing having a curved edge wall provided with a slot adjacent the inside of which said index member is movable.

3. An oven thermometer comprising a cylindrical shell having perforated closures at its ends and having provisions for securing it in an opening in an oven wall, a spindle extending through the closed ends of the shell, thermo-responsive means for turning the spindle including a curved bi-metallic strip connected at one end with the inner end of the spindle indicating means including an arm fastened to and extending radially from the outer end of the spindle, said arm having an index plate attached to and extending angularly from the free end of the arm, a casing attached to the front of the shell and enclosing said arm, and index plate, said casing having a curved edge wall provided with a slot adjacent the inside of which the index plate is movable.

In witness whereof, I have hereunto set my hand this 4th day of April, 1921.

WILLIAM A. RANKIN.